(12) United States Patent
Chen et al.

(10) Patent No.: US 11,438,886 B2
(45) Date of Patent: Sep. 6, 2022

(54) SYSTEM FOR ESTABLISHING POSITIONING MAP DATA AND METHOD FOR THE SAME

(71) Applicant: PSJ INTERNATIONAL LTD., Tortola (VG)

(72) Inventors: Chung-Yuan Chen, Tainan (TW); Alexander I Chi Lai, Taipei (TW); Ruey-Beei Wu, Taipei (TW)

(73) Assignee: PSJ INTERNATIONAL LTD., Tortola (VG)

( * ) Notice: Subject to any disclaimer, the term of this patent is extended or adjusted under 35 U.S.C. 154(b) by 206 days.

(21) Appl. No.: 17/068,882

(22) Filed: Oct. 13, 2020

(65) Prior Publication Data

US 2021/0274310 A1 Sep. 2, 2021

Related U.S. Application Data

(60) Provisional application No. 62/982,073, filed on Feb. 27, 2020.

(51) Int. Cl.
*H04W 72/04* (2009.01)
*H04W 84/18* (2009.01)
(Continued)

(52) U.S. Cl.
CPC ...... *H04W 72/0433* (2013.01); *G01C 21/005* (2013.01); *G01C 21/206* (2013.01);
(Continued)

(58) Field of Classification Search
CPC . H04W 72/0433; H04W 4/024; H04W 4/023; H04W 4/025; H04W 64/003;
(Continued)

(56) References Cited

U.S. PATENT DOCUMENTS 9,373,014 B1 * 6/2016 Mehranfar ............. G05D 1/104
9,589,448 B1 * 3/2017 Schneider ............... F41H 11/00
(Continued)

FOREIGN PATENT DOCUMENTS

CN 104618458 A 5/2015
WO 2017097170 A1 6/2017

*Primary Examiner* — Hussein Elchanti
(74) *Attorney, Agent, or Firm* — Li & Cai Intellectual Property (USA) Office

(57) ABSTRACT

A system for establishing positioning map data and a method for the same are provided. The method includes: obtaining an area map of a target area; setting collection points and a collection path; configuring a Wi-Fi fingerprint collecting device to obtain the area map, the collection points and the collection path; configuring an environmental sensing module to perform environmental sensing on surrounding environment to obtain environmental information; performing a positioning procedure to determine a location of the Wi-Fi fingerprint collecting device in the target area based on the environmental information and the area map to generate positioning information; executing a navigation procedure to move the Wi-Fi fingerprint collecting device along the collection path; determining whether or not the Wi-Fi fingerprint collecting device passes through one of the collection points; and executing a collection procedure to store collected Wi-Fi fingerprint data and positioning information to create positioning map data.

20 Claims, 6 Drawing Sheets

(51) Int. Cl.

| | |
|---|---|
| *G06K 9/62* | (2022.01) |
| *G06F 16/906* | (2019.01) |
| *G06N 20/00* | (2019.01) |
| *G06F 16/907* | (2019.01) |
| *H04W 4/024* | (2018.01) |
| *G01C 21/00* | (2006.01) |
| *G01C 21/20* | (2006.01) |
| *G01S 13/02* | (2006.01) |
| *G05D 1/02* | (2020.01) |
| *H04W 4/02* | (2018.01) |
| *H04W 64/00* | (2009.01) |
| *H04W 84/12* | (2009.01) |

(52) U.S. Cl.
CPC ........ *G01S 13/0209* (2013.01); *G05D 1/0248* (2013.01); *G05D 1/0257* (2013.01); *G05D 1/0282* (2013.01); *G06F 16/906* (2019.01); *G06F 16/907* (2019.01); *G06K 9/6256* (2013.01); *G06N 20/00* (2019.01); *H04W 4/023* (2013.01); *H04W 4/024* (2018.02); *H04W 4/025* (2013.01); *H04W 64/003* (2013.01); *H04W 84/12* (2013.01); *H04W 84/18* (2013.01)

(58) Field of Classification Search
CPC ..... H04W 84/12; H04W 84/18; G06F 16/907; G06F 16/906; G06N 20/00; G01C 21/005; G01C 21/206; G01S 13/0209; G05D 1/0248; G05D 1/0257; G05D 1/0282; G06K 9/6256
See application file for complete search history.

(56) References Cited

U.S. PATENT DOCUMENTS

| | | | | |
|---|---|---|---|---|
| 10,042,086 | B1* | 8/2018 | Smalley | G01W 1/02 |
| 10,655,968 | B2* | 5/2020 | Rezvani | G01C 21/343 |
| 10,852,740 | B2* | 12/2020 | Murphy | G05D 1/0244 |
| 11,119,225 | B2* | 9/2021 | Shimizu | G01S 19/34 |
| 11,249,492 | B2* | 2/2022 | Zamora Esquivel | G05D 1/0282 |
| 2004/0073368 | A1* | 4/2004 | Gonzalez-Banos | G05D 1/0274 701/301 |
| 2008/0288173 | A1* | 11/2008 | Saenger | G01V 1/30 702/16 |
| 2009/0156230 | A1* | 6/2009 | Versteeg | G01S 5/0278 455/456.1 |
| 2009/0156231 | A1* | 6/2009 | Versteeg | H04W 4/021 455/456.1 |
| 2011/0010023 | A1* | 1/2011 | Kunzig | G01C 21/206 701/2 |
| 2011/0112660 | A1* | 5/2011 | Bergmann | G08B 7/066 700/29 |
| 2012/0245846 | A1* | 9/2012 | Yoshida | G01S 19/34 701/526 |
| 2013/0137450 | A1* | 5/2013 | Dai | G01S 19/47 455/456.1 |
| 2013/0138246 | A1* | 5/2013 | Gutmann | G01C 21/12 901/1 |
| 2014/0058556 | A1* | 2/2014 | Kawano | G05D 1/0297 701/2 |
| 2014/0364100 | A1* | 12/2014 | Marti | H04W 4/029 455/418 |
| 2015/0031390 | A1* | 1/2015 | Robertson | G05D 1/027 455/456.1 |
| 2015/0099469 | A1* | 4/2015 | Goldstein | H04W 4/80 455/41.2 |
| 2015/0279213 | A1* | 10/2015 | Balter | G08G 1/147 705/13 |
| 2015/0304634 | A1* | 10/2015 | Karvounis | G06V 10/25 348/46 |
| 2016/0124431 | A1* | 5/2016 | Kelso | G06K 19/06056 701/28 |
| 2017/0192101 | A1* | 7/2017 | Cho | G01S 19/28 |
| 2017/0341746 | A1* | 11/2017 | Erickson | G06N 7/005 |
| 2018/0039282 | A1* | 2/2018 | Gupta | G06Q 10/0833 |
| 2018/0091946 | A1* | 3/2018 | Venkatraman | H04L 43/065 |
| 2018/0143325 | A1* | 5/2018 | Park | G01S 19/072 |
| 2018/0178781 | A1* | 6/2018 | Funk | H04L 67/12 |
| 2018/0180740 | A1* | 6/2018 | Shaffer | G01S 17/06 |
| 2019/0012887 | A1* | 1/2019 | Troesch | G08B 27/006 |
| 2019/0217131 | A1* | 7/2019 | Zechlin | G06V 20/20 |
| 2019/0265722 | A1* | 8/2019 | Haeusler | G01C 15/04 |
| 2020/0022103 | A1* | 1/2020 | Kim | G01S 5/0263 |
| 2021/0080272 | A1* | 3/2021 | Zhou | G01C 21/343 |

* cited by examiner

SYSTEM FOR ESTABLISHING POSITIONING MAP DATA AND METHOD FOR THE SAME

CROSS-REFERENCE TO RELATED PATENT APPLICATION

This application claims priority to the U.S. Provisional Patent Application Ser. No. 62/982,073, filed Feb. 27, 2020, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a system for establishing positioning map data and a method for the same, and more particularly to a system for establishing positioning map data and a method for the same based on Wi-Fi fingerprints.

BACKGROUND OF THE DISCLOSURE

With an expansion of mobile computing nodes and advancement of wireless technology, demands for accurate indoor positioning and related services have become more and more popular. A reliable and accurate indoor positioning can support a wide range of applications.

However, current indoor positioning systems have many issues. For example, these systems are often imprecise, too complex to implement, and/or too expensive. Although an indoor positioning system based on Wi-Fi and received signal strength index (RSSI) signals has high accuracy, such indoor positioning system requires a tremendous amount of time and money to be spent to establish positioning map data, and also requires update costs in maintenance.

Therefore, providing a system and method for establishing positioning map data that can save time and money has become an important issue in the art.

SUMMARY OF THE DISCLOSURE

In response to the above-referenced technical inadequacies, the present disclosure provides a system for establishing positioning map data and a method for the same, which can greatly save construction and maintenance costs.

In one aspect, the present disclosure provides a method for establishing positioning map data, the method includes: obtaining an area map of a target area; setting a plurality of collection points and a collection path in the area map; configuring a Wi-Fi fingerprint collecting device to obtain the area map, the plurality of collection points and the collection path, in which the Wi-Fi fingerprint colleting device includes a plurality of wireless transceiver modules, a processing module, an environmental sensing module, a storage module and a moving module, and the processing module is electrically connected to the plurality of wireless transceiver modules, the environmental sensing module, the storage module and the moving module. The method for establishing positioning map data further includes: setting the Wi-Fi fingerprint collecting device in the target area; configuring the environmental sensing module to perform environmental sensing on surrounding environment to obtain environmental information; configuring the processing module to perform a positioning process to determine a location of the Wi-Fi fingerprint collecting device in the target area based on the environmental information and the area map to generate positioning information; configuring the processing module to execute a navigation process to control the moving module, such that the Wi-Fi fingerprint collecting device moves along the collection path; configuring the processing module to determine whether or not the Wi-Fi fingerprint collecting device passes through one of the plurality of collection points; in response to the processing module determining the Wi-Fi fingerprint collecting device passes through one of the plurality of collection points, configuring the processing module to perform a collection process, including: controlling the wireless transceiver modules to execute a Wi-Fi fingerprint collection process to collect current Wi-Fi fingerprint data of the current collection point; and storing the collected Wi-Fi fingerprint data and the positioning information of the corresponding collection point in the storage module as collection point information; and in response to the Wi-Fi fingerprint collecting device completely passing through the collection path, configuring the processing module to create positioning map data based on the collection point information stored by the storage module.

In certain embodiments, obtaining the area map of the target area includes: drawing and creating the area map according to a plan view of the target area by a user, or performing a simultaneous localization and mapping (SLAM) algorithm to build the area map.

In certain embodiments, the environmental sensing module includes a LiDAR module and at least one ultra-wideband (UWB) module, and the environmental sensing includes: configuring the LiDAR module to perform distance measurement on the surrounding environment to obtain the environmental information; and configuring the at least one UWB module to measure distances from a plurality of base stations located in the surrounding environment to assist in determining the location of the Wi-Fi fingerprint collecting device in the target area.

In certain embodiments, the positioning process is an adaptive Monte Carlo localization (AMCL) algorithm.

In certain embodiments, the Wi-Fi fingerprint collecting device further includes a depth image capturing module electrically connected to the processing module, and the method for establishing positioning map data further includes: configuring the processing module to execute an anti-collision process to control the depth image capturing module to perform image capturing and depth detection on the surrounding environment, and in response to a minimum distance between the Wi-Fi fingerprint collecting device and the surrounding environment being less than a predetermined distance, control the moving module to stop moving; and configuring the processing module to execute an anti-falling process to capture an image of the surrounding environment through the depth image capturing module to determine whether or not a road in front of the Wi-Fi fingerprint capture device is low, and to determine to control the moving module to stop moving in advance.

In certain embodiments, the step of setting the collection points and the collection path in the area map further includes: providing the area map by a user interface electrically connected to the processing module; capturing a plurality of target halfway points set by the user in the area map through the user interface; and configuring the processing module to execute a path planning process according to the plurality of target halfway points to generate the plurality of collection points and the collection path.

In certain embodiments, the path planning process further includes configuring the processing module to dynamically adjust the collection path according to the environmental information, the positioning information, and the area map.

In certain embodiments, the wireless transceiver modules include a mobile device, the mobile device includes a processing unit, a storage unit and a transceiver unit electrically connected to the processing unit, and the Wi-Fi fingerprint collection process further includes: obtaining the positioning information; and storing the collected Wi-Fi fingerprint data of the current collection point, the positioning information and a corresponding collection time in the storage module.

In certain embodiments, the method for establishing positioning map data further includes: configuring a cloud server to communicate with the processing module, wherein the cloud server has a server processing unit and a cloud database; and configuring the processing module to upload the created positioning map data to the cloud server.

In certain embodiments, the method for establishing positioning map data further includes: configuring the server processing unit to execute a data import program to read the positioning map data and perform a data integrity checking process; and configuring the server processing unit to store the checked positioning map data in the cloud database.

Therefore, the system for establishing positioning map data and the method for the same provided by the present disclosure can save tedious work on planning the collection points and the collection path, and save conventional manual data collecting work and maintenance costs for updates due to changes in the environment by configuring the Wi-Fi fingerprint collecting device to automatically perform the collection process.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
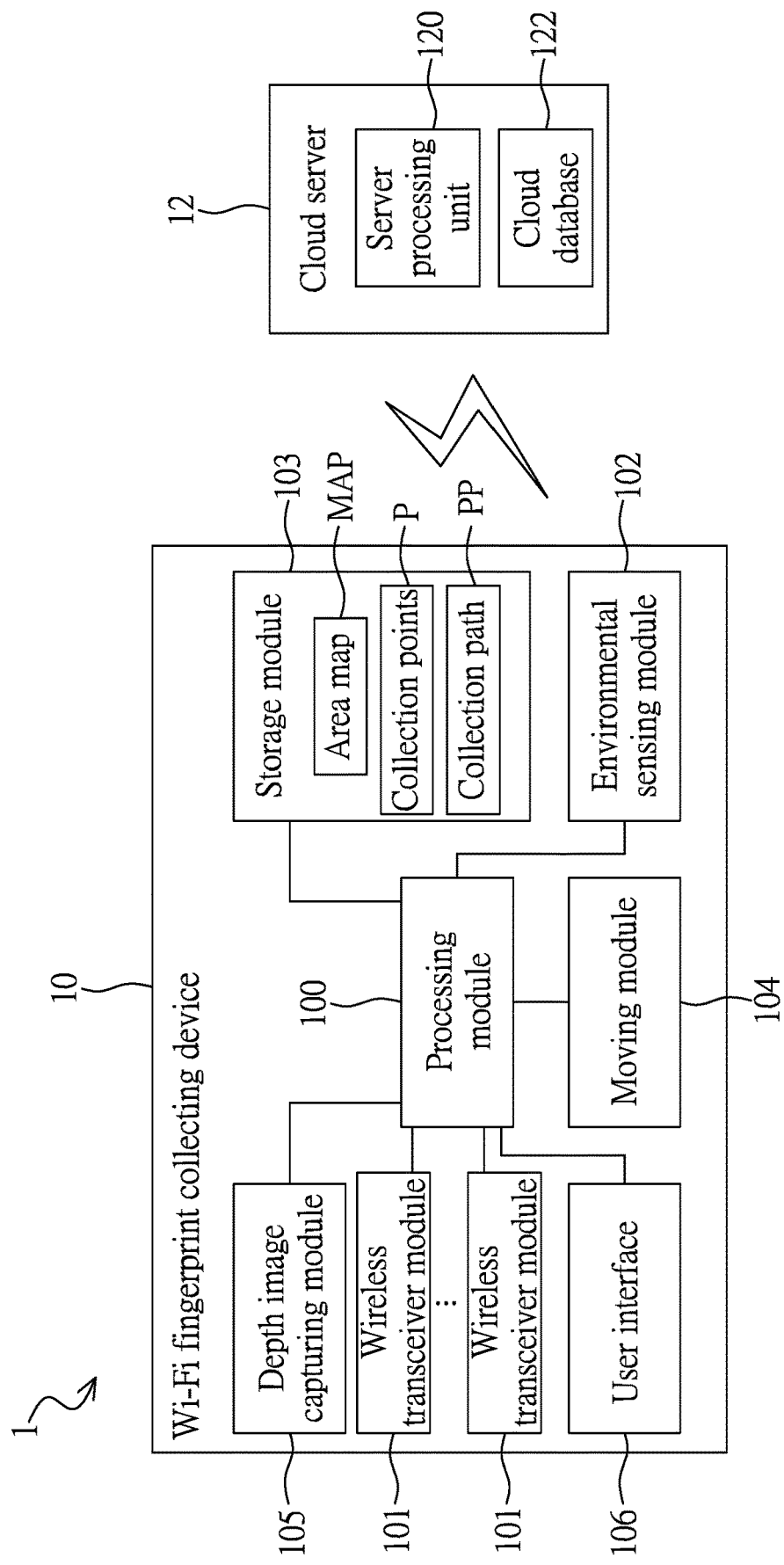
FIG. 1 is a block diagram of a system for establishing positioning map data according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether or not a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

FIG. 1 is a block diagram of a system for establishing positioning map data according to an embodiment of the present disclosure. Reference is made to FIG. 1, an embodiment of the present disclosure provides a positioning map data establishment system 1, which includes a Wi-Fi fingerprint collecting device 10. The Wi-Fi fingerprint collecting device 10 includes a processing module 100, a plurality of wireless transceiver modules 101 electrically connected to the processing module 100, an environmental sensing module 102, a storage module 103, and a moving module 104.

The processing module 100 can include any suitable processor-driven computing device, including but not limited to desktop computing devices, laptop computing devices, servers, smartphones, tablet computers, and the like. The processing module 100 can be an integrated circuit such as a programmable logic controller circuit, a microprocessor circuit, or a micro-controller circuit, or an electronic device including the aforementioned integrated circuit, such as tablet computer, mobile phone, notebook computer or desktop computer, but the present disclosure is not limited thereto. The aforementioned processing module 100 can have, for example, a robot operating system (ROS).

The wireless transceiver module 101 can be configured to transmit and receive signals, for example, it can be a mobile device such as a tablet computer or a mobile phone, or can be a wireless network card with an interface such as universal serial bus (USB) and peripheral component interconnect express (PCIe). In detail, the wireless transceiver module 101 is mainly used to detect the number of Wi-Fi access points, and detect received signal strength indicator (RSSI)

values, bandwidths, channel position, and fine time measurement (FTM) ranging values based on 802.11mc specification, and the like, that utilize the Wi-Fi access points to generate Wi-Fi fingerprints. However, not all embodiments are limited to RSSI fingerprint technology, and other Wi-Fi location technologies can also be used to simultaneously mix data from various radio sources, such as combined Wi-Fi, radio frequency identification (RFID) or wireless Bluetooth transmission of data. In some embodiments, the wireless transceiver module 101 can be, for example, a mobile device, which includes a processing unit (for example, a processor), a storage unit (for example, flash memory) and a transceiver unit (for example, a Wi-Fi module supporting 2.4G/5G frequency band) electrically connected to the processing unit.

In addition, the environmental sensing module 102 can be used for environmental sensing of surrounding environment, and the environmental sensing module 102 can include a LiDAR module and at least one ultra-wideband (UWB) module, the LiDAR module can be used to scan the environment, measure the distance of the surrounding environment, and provide environmental information, and the at least one UWB module can be used for assisting environmental positioning.

The storage module 103 can be, for example, a memory system, which can include non-volatile memory (such as flash memory) and system memory (such as DRAM) for storing the area map MAP, a plurality of collection points P and a collection path PP in the area map MAP. In detail, the target area may be an indoor place or building that is predetermined to perform positioning, the area map MAP can include one or more maps of each floor of the place or building, and the plurality of collection points P can be multiple coordinates scattered on the area map MAP, and the collection path PP can be a path passing through the plurality of collection points P.

Figure 2:
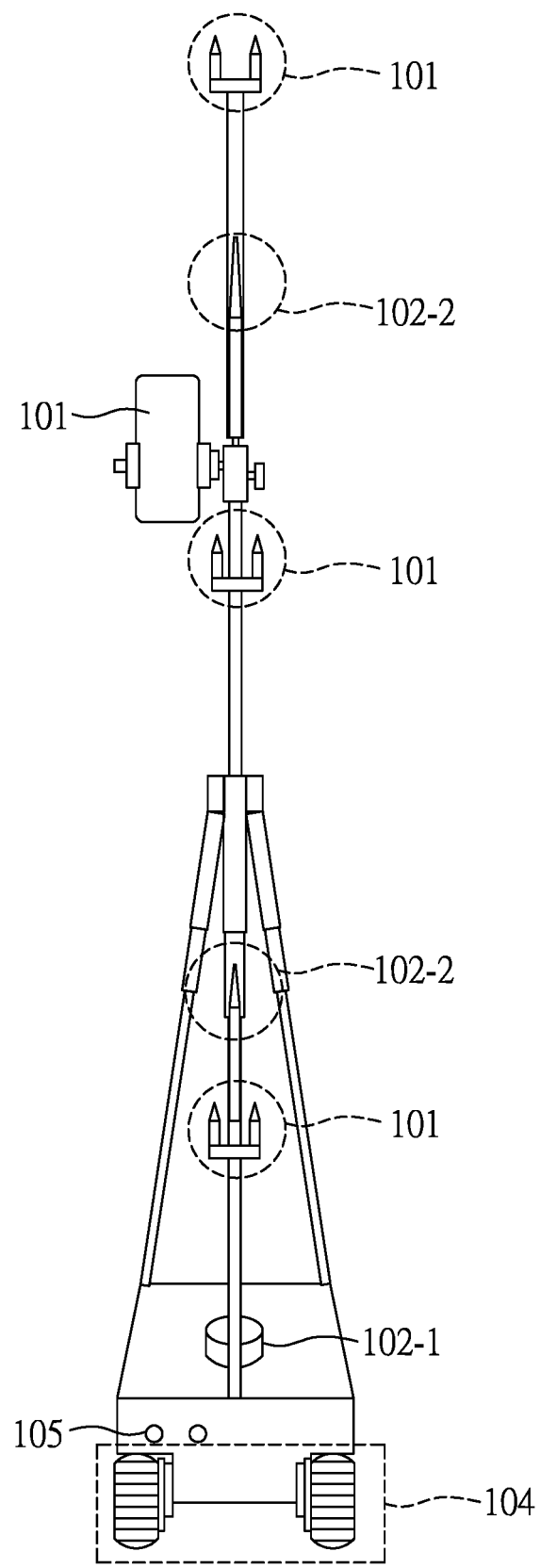
FIG. 2 is a schematic diagram of a Wi-Fi fingerprint collecting device according to an embodiment of the present disclosure.

Reference is made to FIG. 2, which is a schematic diagram of a Wi-Fi fingerprint collecting device according to an embodiment of the present disclosure. As shown in FIG. 2, the moving module 104 can include, for example, a motor, a tire, and a carrier, where the carrier may be used to carry the aforementioned processing module 100, wireless transceiver module 101, environmental sensing module 102, and storage module 103. The motor and tires can be configured to be driven by the processing module 100 to move the Wi-Fi fingerprint acquisition device 10. Further, a plurality of wireless transceiver modules 101 can be installed on the Wi-Fi fingerprint collecting device 10 at different heights to simultaneously collect Wi-Fi fingerprint data of the different heights. The plurality of wireless transceiver modules 101 can each include multiple antenna units, and are configured on the premise that their field patterns do not conflict, so as to avoid mutual interference between multiple antennas. Moreover, multiple wireless transceiver modules 101 can support various manners for collecting Wi-Fi fingerprint data, such as supporting the aforementioned mobile devices, or wireless network cards with USB, PCIe and other interfaces.

In certain embodiments, the mobile module 104 can be controlled by the ROS of the processing module 100. In some embodiments, the Wi-Fi fingerprint collecting device 10 can further include a depth image capturing module 105, such as a depth camera, which is electrically connected to the processing module 100. By adopting this configuration, when the Wi-Fi fingerprint collecting device 10 is moving, the processing module 100 can execute an anti-collision process to control the depth image capturing module 105 to perform image capture and depth detection of the surrounding environment. In response to the minimum distance between the Wi-Fi fingerprint collecting device 10 and the environment being less than a predetermined distance, the moving module 104 is controlled to stop moving to avoid collisions; and the processing module 100 can also perform an anti-falling process, in which the depth image capturing module 105 detects whether or not the road in front of the Wi-Fi fingerprint collecting device 10 is low, and controls the mobile module 104 to stop moving in advance to avoid entering the environment with large height differences such as stairs.

Figure 3:
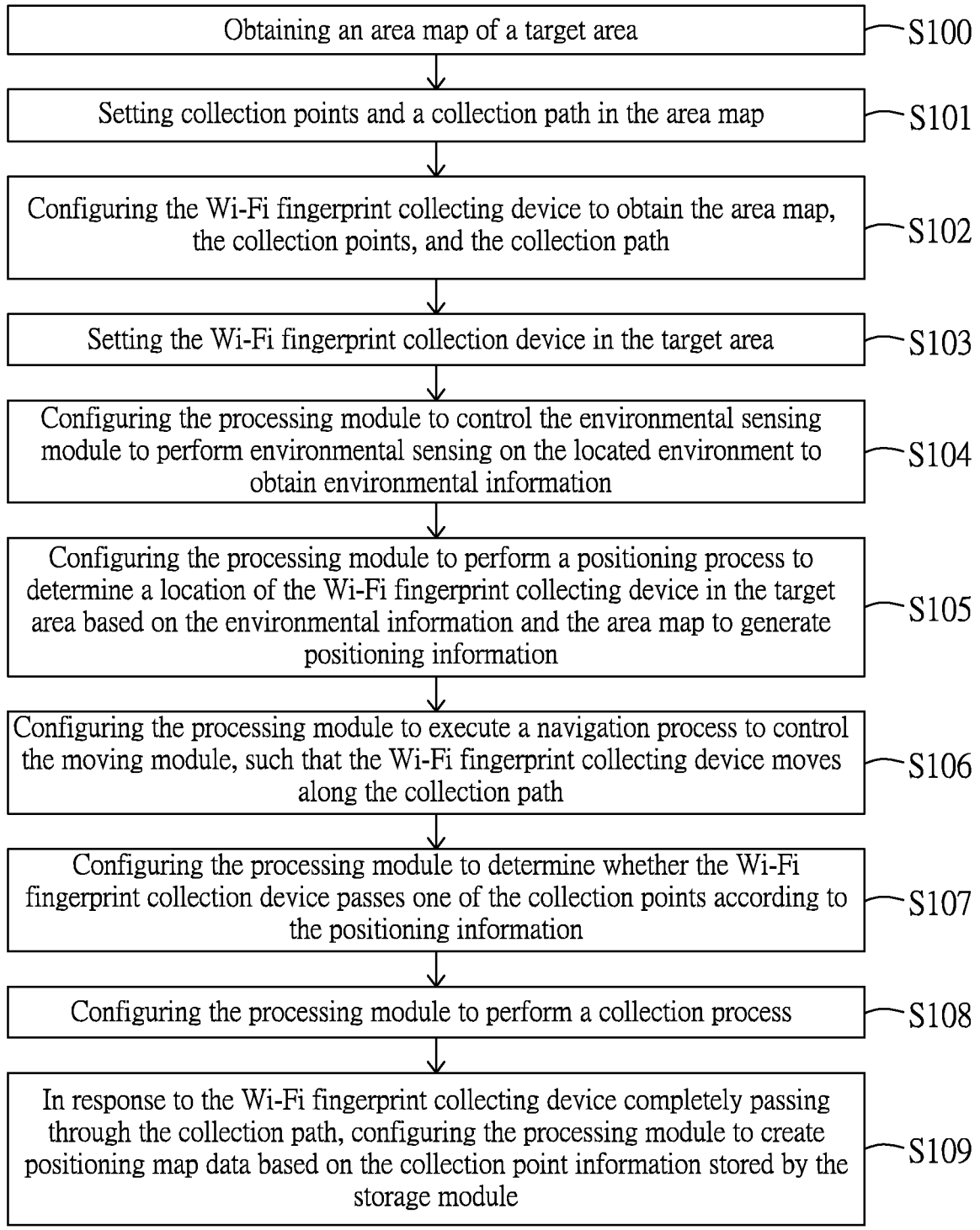
FIG. 3 is a flowchart of a method for establishing positioning map data according to an embodiment of the present disclosure.

Reference is made to FIG. 3, which is a flowchart of a method for establishing positioning map data according to an embodiment of the present disclosure. As shown in FIG. 3, the present disclosure provides a method for establishing positioning map data, which is suitable for the system for establishing positioning map data mentioned above, but the present disclosure is not limited thereto, the method includes the following steps:

Step S100: obtaining an area map of a target area. In certain embodiments, manners for obtaining the area map MAP of the target area can include drawing and creating the area map MAP according to a plan view of the target area by a user, or performing a simultaneous localization and mapping (SLAM) algorithm to build the area map MAP. For example, the environment can be scanned by the LiDAR module to provide environmental characteristic data. The provided environment characteristic data can be combined with G-mapping algorithm in the ROS of the processing module 100 to realize SLAM algorithm, which can include supervised or unsupervised SLAM algorithm. Furthermore, the generated area map MAP can be further corrected manually to ensure an authenticity thereof.

Step S101: setting a plurality of collection points P and a collection path PP in the area map MAP.

Figure 4:
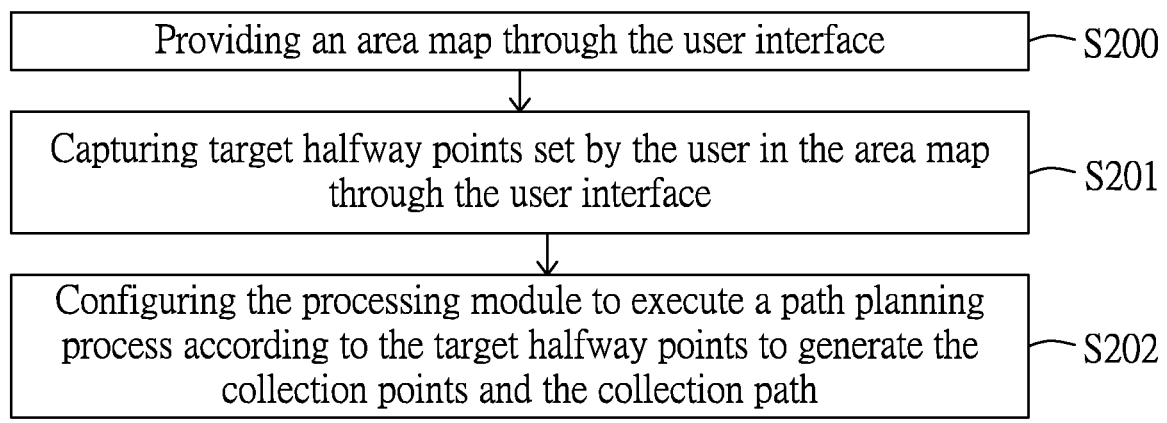
FIG. 4 is a flowchart showing a setting process for collection points and a collection path according to an embodiment of the present disclosure.
Figure 5:
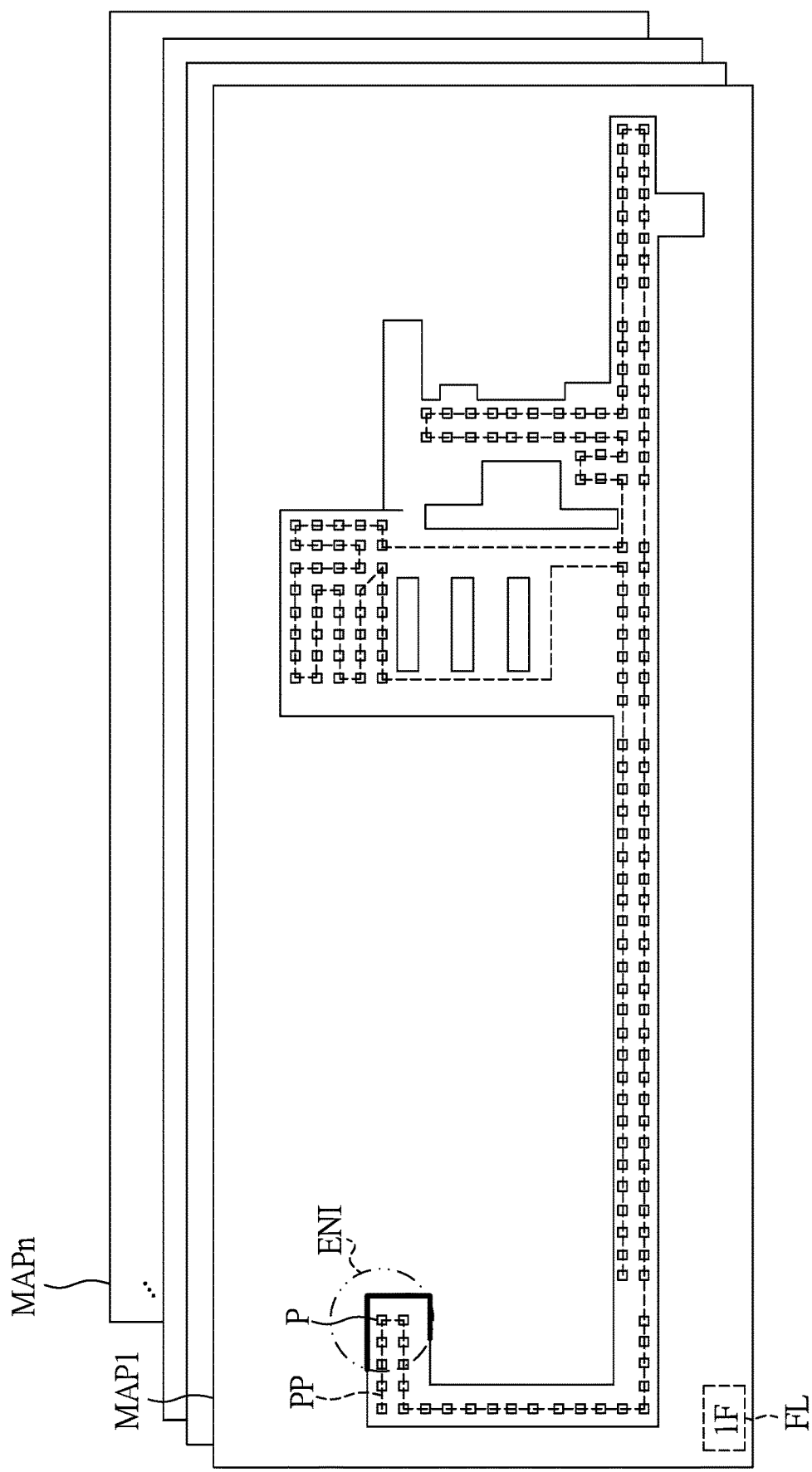
FIG. 5 is a schematic diagram of collection points and a collection path according to an embodiment of the present disclosure.

Reference can be made to FIGS. 4 and 5, FIG. 4 is a flowchart showing a setting process for collection points and a collection path according to an embodiment of the present disclosure, and FIG. 5 is a schematic diagram of collection points and a collection path according to an embodiment of the present disclosure. As shown in FIG. 4, the setting process can include the following steps:

Step S200: providing an area map MAP through the user interface 106. In this step, the user interface 106 can be electrically connected to the processing module 100 as shown in FIG. 1, the user interface 106 can be, for example, a configuration including a display, a keyboard, and a mouse, or a network remote command line interface (such a SSH), a remote graphical interface (such as programs like VNC, Teamviewer, and the like), or calls ROS related commands (such as Roslaunch) and graphical programs (such as RViz) through the local network. Taking the target area being a building with multiple floors as an example, the user interface 106 can provide multiple floor maps MAP1 to MAPn as shown in FIG. 5, and each of the floor maps MAP1 to MAPn is marked with floor information FL.

Step S201: capturing a plurality of target halfway points set by the user in the area map MAP through the user interface 106. As shown in FIG. 5, the user can plan multiple target halfway points in the area where Wi-Fi fingerprint collection is required.

Step S202: configuring the processing module 100 to execute a path planning process according to the plurality of target halfway points to generate the plurality of collection points P and the collection path PP. For example, the path planning process can automatically generate a collection path, plan the collection points on the collection path, and use a set specific distance as intervals between the collection points.

Next, the method for establishing positioning map data proceeds to step S102: configuring the Wi-Fi fingerprint collecting device 10 to obtain the area map MAP, the collection points P, and the collection path PP.

Step S103: setting the Wi-Fi fingerprint collecting device 10 in the target area.

Step S104: configuring the processing module 100 to control the environmental sensing module 102 to perform environmental sensing on the surrounding environment to obtain environmental information. For example, the environmental sensing module 102 (such as LiDAR 102-1 and one or more UWB modules 102-2) can scan the environmental information ENI as shown in FIG. 5. For example, the environmental information ENI can include distances between the Wi-Fi fingerprint collecting device 10 and surrounding walls and the shape of the walls. In detail, in addition to the LiDAR, more than one UWB modules are also used for assisting the environmental positioning, in which the UWB modules uses the measurement of the distances from small number of anchors in the environment to infer the position of the Wi-Fi fingerprint collecting device 10 in the target area.

Step S105: configuring the processing module 100 to perform a positioning process to determine a location of the Wi-Fi fingerprint collecting device 10 in the target area based on the environmental information and the area map MAP to generate positioning information. In this step, the positioning process can be, for example, an adaptive Monte Carlo localization (AMCL) algorithm, which collects and integrates the various environmental information obtained above to perform indoor environment positioning and navigation. The generated positioning information can be used as reference material for subsequent marking of Wi-Fi fingerprints. For example, the environmental information ENI, such as the distance of the surrounding walls and the shape of the walls obtained in the previous step, can be compared with the area map MAP to confirm the location of the Wi-Fi fingerprint collecting device 10.

Step S106: configuring the processing module 100 to execute a navigation process to control the moving module 104, such that the Wi-Fi fingerprint collecting device 10 moves along the collection path PP. During the collection process, the path planning program can further dynamically adjust the collection path PP based on the environmental information, the positioning information and the area map MAP. For example, if an unexpected situation occurred on the way and the current collection point P cannot be reached, the current collection point P can automatically be postponed to the next collection point P, and the skipped collection point P will be moved to the end of the queue.

Step S107: configuring the processing module 100 to determine whether or not the Wi-Fi fingerprint collecting device 10 passes one of the collection points P according to the positioning information.

In response to the processing module 100 determining the Wi-Fi fingerprint collecting device 10 passes through one of the plurality of collection points P, the method proceeds to step S108: configuring the processing module 100 to perform a collection process.

Figure 6:
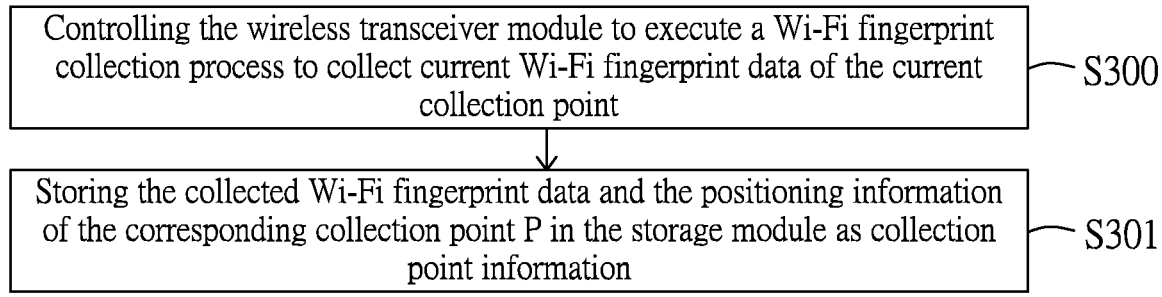
FIG. 6 is a flowchart of a collection process according to an embodiment of the present disclosure.

Here, reference can be further made to FIG. 6, which is a flowchart of a collection process according to an embodiment of the present disclosure. As shown in FIG. 6, the collection process further includes the following steps:

Step S300: controlling the wireless transceiver module 101 to execute a Wi-Fi fingerprint collection process to collect current Wi-Fi fingerprint data of the current collection point P.

In detail, the Wi-Fi fingerprint data can associate a location in the actual environment with a certain "fingerprint", and one location corresponds to one unique fingerprint. The fingerprint can be single-dimensional or multi-dimensional. For example, when the wireless transceiver module 101 is receiving or transmitting information, the fingerprint can be one or more characteristics of the information or signal (signal strength is one of the most commonly used characteristic).

Wi-Fi fingerprint data can be of multiple types, and any feature with unique location can be used as one record of Wi-Fi fingerprint data. For example, multipath structure data related to the Wi-Fi signal space at a certain location, the number of detected access points or base stations, whether or not certain access points (AP) or base stations can be detected, detectable received signal strength (RSS) of each access point, round-trip time or delay of the signal when communicating via Wi-Fi (such as CSI information, or FTM ranging value based on the 802.11mc specification, etc.), these can be used as a Wi-Fi fingerprint data, or the above features can be combined as Wi-Fi fingerprint data.

Step S301: storing the collected Wi-Fi fingerprint data and the positioning information of the corresponding collection point P in the storage module 103 as collection point information. In detail, the wireless transceiver module 101 can receive signals from multiple access points on the corresponding collection point P, and use the RSS from the multiple access points to form an RSS vector as a fingerprint associated with the positioning information, which is the Wi-Fi fingerprint described in the present disclosure.

In some embodiments, the wireless transceiver module 101 (such as a mobile device) can obtain the positioning information, and store the collected Wi-Fi fingerprint data, positioning information, and corresponding collection time of the current collection point in the storage unit in the mobile to be used as an offline backup.

Returning to the flow of the method for establishing positioning map data, the method proceeds to step S109: in response to the Wi-Fi fingerprint collecting device 10 completely passing through the collection path PP, configuring the processing module 100 to create positioning map data based on the collection point information stored by the storage module 103.

As shown in FIG. 1, the system 1 for establishing the positioning map data can further include a cloud server 12 configured to communicate with the processing module 100, and the cloud server 12 has a server processing unit 120 and a cloud database 122. In the process of establishing the positioning map data, or after the establishment is completed, the processing module 100 can upload the established positioning map data to the cloud server 12.

The server processing unit 120 can be used to execute a data import program to read the positioning map data and perform a data integrity checking process, and store the checked positioning map data in the cloud database 122. In detail, the original collected data (that is, the positioning map data) can be diversified and stored in the cloud database 122 according to the collection date. By executing the data import program, the original collected data can be read in and the data integrity checking process is performed, then the collected data is added in a non-relational database of the corresponding building and floor according to a specific file format, and the information of this import operation will also be recorded in the cloud database 122.

In conclusion, the system for establishing positioning map data and the method for the same provided by the present disclosure can save tedious work on planning the collection points and the collection path, and save conventional manual data collecting work and maintenance costs for updates due to changes in the environment by configuring the Wi-Fi fingerprint collecting device to automatically perform the collection process.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for establishing positioning map data, comprising:
    obtaining an area map of a target area;
    setting a plurality of collection points and a collection path in the area map;
    configuring a Wi-Fi fingerprint collecting device to obtain the area map, the plurality of collection points and the collection path, wherein the Wi-Fi fingerprint collecting device includes a plurality of wireless transceiver modules, a processing module, an environmental sensing module, a storage module and a moving module, and the processing module is electrically connected to the plurality wireless transceiver modules, the environmental sensing module, the storage module and the moving module;
    setting the Wi-Fi fingerprint collecting device in the target area;
    configuring the environmental sensing module to perform environmental sensing on a surrounding environment to obtain environmental information;
    configuring the processing module to perform a positioning process to determine a location of the Wi-Fi fingerprint collecting device in the target area based on the environmental information and the area map to generate positioning information;
    configuring the processing module to execute a navigation process to control the moving module, such that the Wi-Fi fingerprint collecting device moves along the collection path;
    configuring the processing module to determine whether or not the Wi-Fi fingerprint collecting device passes through one of the plurality of collection points;
    in response to the processing module determining that the Wi-Fi fingerprint collecting device passes through one of the plurality of collection points, configuring the processing module to perform a collection process, including:
        controlling the wireless transceiver modules to execute a Wi-Fi fingerprint collection process to collect current Wi-Fi fingerprint data of the current collection point; and
        storing the collected Wi-Fi fingerprint data and the positioning information of the corresponding collection point in the storage module as collection point information; and
    in response to the Wi-Fi fingerprint collecting device completely passing through the collection path, configuring the processing module to establish positioning map data based on the collection point information stored by the storage module.

2. The method according to claim 1, wherein obtaining the area map of the target area includes: drawing and creating the area map according to a plan view of the target area by a user, or performing a simultaneous localization and mapping (SLAM) algorithm to build the area map.

3. The method according to claim 1, wherein the environmental sensing module includes a light detection and ranging (LiDAR) module and at least one ultra-wideband (UWB) module, and the environmental sensing includes:
    configuring the LiDAR module to perform distance measurement on the surrounding environment to obtain the environmental information; and
    configuring the at least one UWB module to measure distances between a plurality of base stations located in the surrounding environment and the at least one UWB to assist in determining the location of the Wi-Fi fingerprint collecting device in the target area.

4. The method according to claim 3, wherein the positioning process is an adaptive Monte Carlo localization (AMCL) algorithm.

5. The method according to claim 1, wherein the Wi-Fi fingerprint collecting device further includes a depth image capturing module electrically connected to the processing module, and the method for establishing positioning map data further includes:
    configuring the processing module to execute an anti-collision process to control the depth image capturing module to perform image capturing and depth detection on the surrounding environment, and in response to a minimum distance between the Wi-Fi fingerprint collecting device and the surrounding environment being less than a predetermined distance, control the moving module to stop moving; and
    configuring the processing module to execute an anti-falling process to capture image of the surrounding environment through the depth image capturing module to determine whether or not a road in front of the Wi-Fi fingerprint capture device is low, and to determine to control the moving module to stop moving in advance.

6. The method according to claim 1, wherein the step of setting the collection points and the collection path in the area map further includes:
    providing the area map by a user interface electrically connected to the processing module;
    capturing a plurality of target halfway points set by the user in the area map through the user interface; and
    configuring the processing module to execute a path planning process according to the plurality of target halfway points to generate the plurality of collection points and the collection path.

7. The method according to claim 6, wherein the path planning process further includes configuring the processing module to dynamically adjust the collection path according to the environmental information, the positioning information, and the area map.

8. The method according to claim 1, wherein the wireless transceiver modules include a mobile device, the mobile device includes a processing unit, and a storage unit and a transceiver unit that are electrically connected to the processing unit, and the Wi-Fi fingerprint collection process further includes:
  obtaining the positioning information; and
  storing the collected Wi-Fi fingerprint data of the current collection point, the positioning information and a corresponding collection time in the storage module.

9. The method for establishing positioning map data according to claim 1, further comprising:
  configuring a cloud server to communicate with the processing module, wherein the cloud server includes a server processing unit and a cloud database; and
  configuring the processing module to upload the established positioning map data to the cloud server.

10. The method for establishing positioning map data according to claim 9, further comprising:
  configuring the server processing unit to execute a data import program to read the positioning map data and perform a data integrity checking process; and
  configuring the server processing unit to store the checked positioning map data in the cloud database.

11. A system for establishing positioning map data, comprising:
  a Wi-Fi fingerprint collecting device, which includes:
    a processing module;
    a plurality of wireless transceiver modules electrically connected to the processing module, and configured to transmit and receive signals;
    an environmental sensing module electrically connected to the processing module, and configured to perform environmental sensing on surrounding environment;
    a storage module electrically connected to the processing module and configured to store an area map of a target area, a plurality of collection points in the area map, and a collection path; and
    a moving module electrically connected to the processing module and configured to be driven by the processing module to move the Wi-Fi fingerprint collecting device,
  wherein when the Wi-Fi fingerprint collecting device is set in the target area, the processing module is configured to control the environmental sensing module to perform environmental sensing on the surrounding environment to obtain environmental information;
  wherein the processing module is further configured to perform a positioning process to determine a location of the Wi-Fi fingerprint collecting device in the target area based on the environmental information and the area map to generate positioning information;
  wherein the processing module is configured to execute a navigation process to drive and control the moving module, such that the Wi-Fi fingerprint collecting device moves along the collection path, and the processing module is configured to determine whether or not the Wi-Fi fingerprint collecting device passes through one of the plurality of collection points;
  wherein in response to the processing module determining that the Wi-Fi fingerprint collecting device passes through one of the plurality of collection points, the processing module is configured to perform a collection process including:
    controlling the wireless transceiver module to execute a Wi-Fi fingerprint collection process to collect current Wi-Fi fingerprint data of the current collection point; and
    storing the collected Wi-Fi fingerprint data and the positioning information of the corresponding collection point in the storage module as collection point information; and
  wherein in response to the Wi-Fi fingerprint collecting device completely passing through the collection path, the processing module is configured to establish positioning map data based on the collection point information stored by the storage module.

12. The system for establishing positioning map data according to claim 11, wherein the area map of the target area is drawn and created according to a plan view of the target area, or the area map is created by configuring the processing module to perform a simultaneous localization and mapping (SLAM) algorithm.

13. The system according to claim 11, wherein the environmental sensing module includes a LiDAR module and at least one Ultra-wideband (UWB) module.

14. The system according to claim 13, wherein the environmental sensing of the positioning process includes:
  configuring the LiDAR module to perform distance measurement on the surrounding environment to obtain the environmental information; and
  configuring the at least one UWB module to measure distances from a plurality of base stations located in the surrounding environment to assist in determining the location of the Wi-Fi fingerprint collecting device in the target area.

15. The system according to claim 11, wherein the Wi-Fi fingerprint collecting device further includes a depth image capturing module electrically connected to the processing module, and the processing module is configured to execute an anti-collision process to control the depth image capturing module to perform image capturing and depth detection on the surrounding environment, and in response to a minimum distance between the Wi-Fi fingerprint collecting device and the surrounding environment being less than a predetermined distance, the processing module is configured to control the moving module to stop moving; and
  wherein the processing module is configured to execute an anti-falling process to capture image of the surrounding environment through the depth image capturing module to determine whether or not a road in front of the Wi-Fi fingerprint capture device is low, and to determine to control the moving module to stop moving in advance.

16. The system according to claim 11, further comprising a user interface electrically connected to the processing module and configured to provide the area map and capture a plurality of target halfway points set by the user in the area map; and
  wherein the processing module is configured to execute a path planning process according to the plurality of target halfway points to generate the plurality of collection points and the collection path.

17. The system according to claim 16, wherein the path planning process further includes configuring the processing module to dynamically adjust the collection path according to the environmental information, the positioning information, and the area map.

18. The system according to claim 11, wherein the wireless transceiver modules include a mobile device, the mobile device includes a processing unit, and a storage unit and a transceiver unit that are electrically connected to the processing unit, and the Wi-Fi fingerprint collection process further includes:
  obtaining the positioning information; and storing the collected Wi-Fi fingerprint data of the current collection point, the positioning information and a corresponding collection time in the storage module.

19. The system according to claim 11, further comprising a cloud server configured to communicate with the processing module, wherein the cloud server includes a server processing unit and a cloud database, wherein the processing module is configured to upload the created positioning map data to the cloud server.

20. The system according to claim 19, wherein the server processing unit is configured to execute a data import program to read the positioning map data and perform a data integrity checking process, and store the checked positioning map data in the cloud database.

* * * * *